United States Patent
Gilat et al.

(10) Patent No.: US 9,015,723 B2
(45) Date of Patent: Apr. 21, 2015

(54) RESOURCE OPTIMIZATION FOR REAL-TIME TASK ASSIGNMENT IN MULTI-PROCESS ENVIRONMENTS

(75) Inventors: Dagan Gilat, Haifa (IL); Mike A. Marin, Costa Mesa, CA (US); Michael Masin, Haifa (IL); Segev Eliezer Wasserkrug, Haifa (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 12/564,934

(22) Filed: Sep. 23, 2009

(65) Prior Publication Data

US 2011/0072436 A1     Mar. 24, 2011

(51) Int. Cl.
  *G06F 9/46*     (2006.01)
  *G06F 9/48*     (2006.01)

(52) U.S. Cl.
  CPC .................... *G06F 9/4881* (2013.01)

(58) Field of Classification Search
  CPC combination set(s) only.
  See application file for complete search history.

(56) References Cited

U.S. PATENT DOCUMENTS

| | | | |
|---|---|---|---|
| 5,737,228 A | 4/1998 | Ishizuka et al. | |
| 6,895,384 B1 | 5/2005 | Dalal | |
| 7,383,267 B2 | 6/2008 | Deimel et al. | |
| 7,389,276 B1* | 6/2008 | Barnard et al. | 705/400 |
| 7,441,244 B2* | 10/2008 | Longobardi | 718/104 |
| 8,296,770 B2* | 10/2012 | Ohno | 718/103 |
| 8,522,243 B2* | 8/2013 | Ventroux et al. | 718/103 |
| 2005/0223020 A1 | 10/2005 | Cutlip et al. | |
| 2006/0053039 A1 | 3/2006 | Gamarnik et al. | |
| 2009/0024432 A1 | 1/2009 | Bauters | |
| 2008/0162232 A1 | 9/2009 | Bauters et al. | |
| 2010/0180280 A1* | 7/2010 | Chang et al. | 718/104 |

FOREIGN PATENT DOCUMENTS

| | | |
|---|---|---|
| EP | 1895453 A1 | 9/2009 |
| JP | 08215994 A2 | 8/1996 |
| JP | 2005346315 A2 | 12/2005 |

* cited by examiner

*Primary Examiner* — Eric C Wai

(57) ABSTRACT

A novel and useful system and method of decentralized decision-making for real-time scheduling in a multi-process environment. For each process step and/or resource capable of processing a particular step, a service index is calculated. The calculation takes into account several measures, such as business level measures, operational measures and employee level measure. The decision of which process step a resource should next work on or what step to assign to a resource is based on the service index calculation and, optionally, other production factors. In one embodiment, the resource is assigned the process step with the maximal service index. Alternatively, when a resource becomes available, all process steps the resource is capable of processing are presented in order of descending service index. The resource then selects which process step to work on next.

29 Claims, 6 Drawing Sheets

RESOURCE OPTIMIZATION FOR REAL-TIME TASK ASSIGNMENT IN MULTI-PROCESS ENVIRONMENTS

FIELD OF THE INVENTION

The present invention relates to the field of real-time scheduling/assignment, and more particularly relates to a real-time method of resource optimization for use in a multi-process environment.

SUMMARY OF THE INVENTION

A novel and useful system and method of decision-making for real-time scheduling in a multi-process environment. For each process step and/or resource capable of processing a particular step, a service index is calculated. The calculation of the service index takes into account several types of measures, such as business level measures, operational measures and employee level measures. The decision regarding the step-to-resource assignment is based on the service index calculation and, optionally, other production factors. The invention embodiments cover various mechanisms for assigning resources and process steps such as pull, push and mixed mechanisms. In one embodiment, the step-to-resource assignment is automatic: for example, resource is assigned the process step with the maximal service index. Alternatively, the assignment decision is taken by an available resource, given information on the processing priorities, based on service indices and, optionally, other production factors.

There is thus provided in accordance with the invention, a method of resource optimization for scheduling in a multi-process environment, the method comprising the steps of calculating a service index for each step a resource is capable of processing, presenting a plurality of steps to the resource for selection that can be processed by the resource ordered based on the service indices and assigning one of the plurality of steps selected by the resource to the resource for processing.

There is also provided in accordance with the invention, a method of resource optimization for scheduling in a multi-process environment, the method comprising the steps of calculating a service index for each resource capable of processing the step and assigning the step to one of the resources according to the service indices.

There is further provided in accordance with the invention, a method of resource optimization for scheduling in a multi-process environment, the method comprising the steps of determining a step requires a resource assignment, for all idle resources capable of processing the step, calculating a service index corresponding thereto and assigning the step to one of the idle resources according to the service indices.

There is also provided in accordance with the invention, a computer program product for scheduling in a multi-process environment, the computer program product comprising a computer usable medium having computer usable code embodied therewith, the computer usable program code comprising computer usable code configured for calculating a service index for each resource that can process the step and each step that can be processed by the resource and computer usable code configured for selecting or assigning a resource or step in accordance with the service indices.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
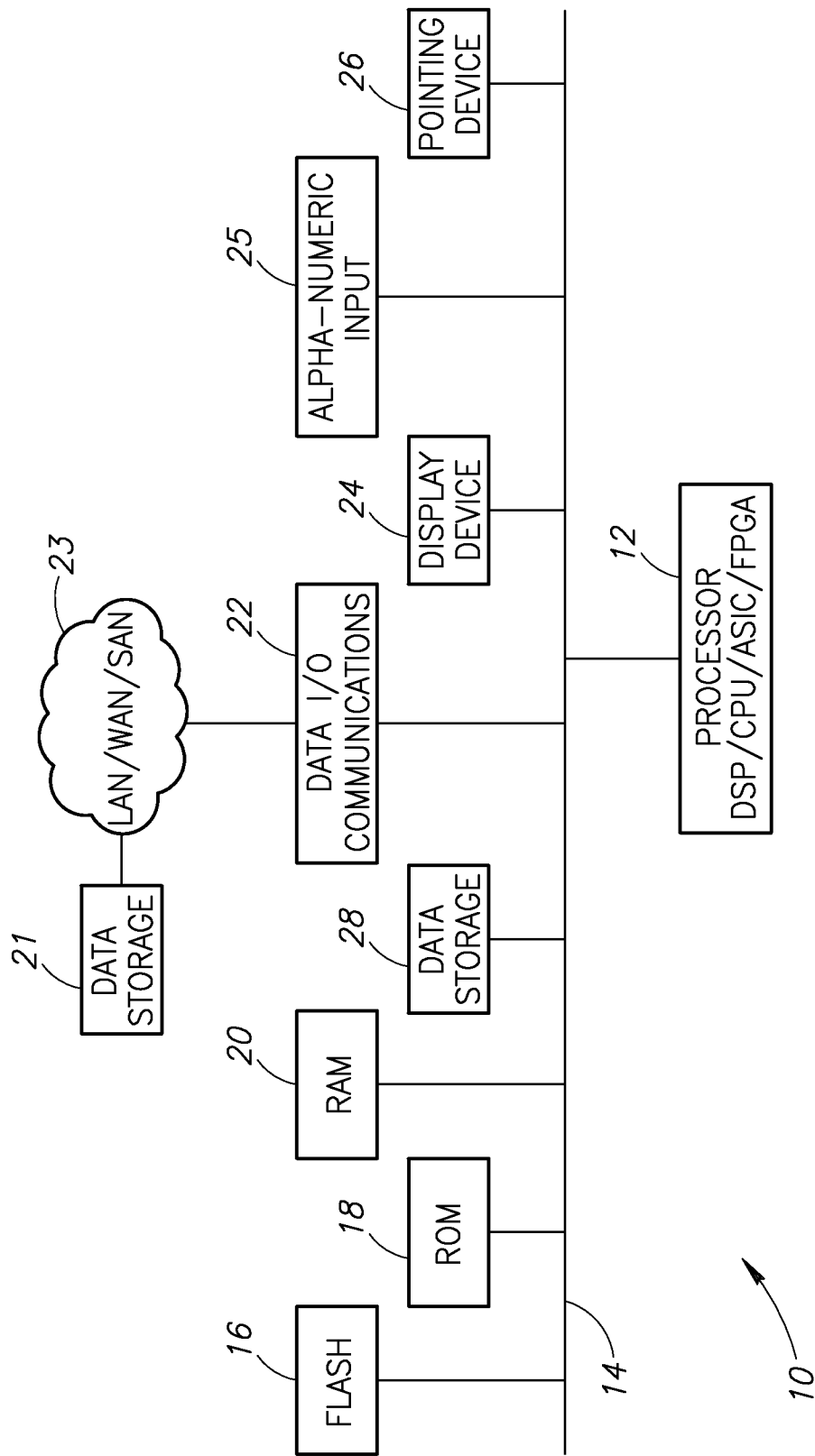
FIG. 1 is a block diagram illustrating an example computer processing system adapted to implement the resource optimization mechanism of the present invention.

The following notation is used throughout this document:

| Term | Definition |
| --- | --- |
| ASCII | American Standard Code for Information Interchange |
| ASIC | Application Specific Integrated Circuit |
| BP | Basic Parallel |
| BPM | Business Process Management |
| CDROM | Compact Disc Read Only Memory |
| CPU | Central Processing Unit |
| DSP | Digital Signal Processor |
| EEROM | Electrically Erasable Read Only Memory |
| EPROM | Erasable Programmable Read-Only Memory |
| EPT | Expected Processing Time |
| ERPT | Expected Residual Processing Time |
| FPGA | Field Programmable Gate Array |
| FTP | File Transfer Protocol |
| HTTP | Hyper-Text Transport Protocol |
| I/O | Input/Output |
| LAN | Local Area Network |
| NIC | Network Interface Card |
| RAM | Random Access Memory |
| RF | Radio Frequency |
| ROM | Read Only Memory |
| SAN | Storage Area Network |
| SE | Sequentially Executable |
| SLA | Service Level Agreement |
| URL | Uniform Resource Locator |
| WAN | Wide Area Network |

DETAILED DESCRIPTION OF THE INVENTION

The present invention is a method of decision making for real-time scheduling/assignment in a multi-process environment. Systems constructed using the methods and techniques of the present invention can be applied to work assignment/scheduling in complex business process environments. The mechanism of the present invention uniquely combines, builds upon, and extends in a unique manner, techniques from call center routing and manufacturing shops. The mechanism may be implemented as either a decentralized or centralized system.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A block diagram illustrating an example computer processing system adapted to implement the system and methods of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 21 and/or 28 for storing application programs and data. The system comprises computer readable storage medium that may include any suitable memory means, including but not limited to, magnetic storage, optical storage, semiconductor volatile or non-volatile memory or any other memory storage device.

Software adapted to implement the system and methods of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various possible embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Real-Time Resource Optimization Mechanism

Many large service enterprises, such as banks and insurance companies, are required to fulfill a large number of business processes, where these processes require a significant number of skilled human resources. Examples include loan approvals in a bank, in which skilled employees are required to carry out the steps associated with calculating the loan terms, and issuing the loan, and issuing a new insurance policy in insurance companies, in which skilled employees are required to carry out the steps associated with calculating the policy terms, and issuing the policy.

In such settings, at each point in time, there are usually a large number of concurrent process instances in progress, where each such process instance belongs to one of several process types. For example, in an insurance company setting, there may be many new insurance policies in progress, together with many insurance claims. The mechanism of the present invention is capable of handling scenarios where each process may require several skill sets to fulfill, may have a different service level agreement or service objective defined (either explicitly or implicitly) and may have difference priorities. In such cases, the mechanism assigns the resources (e.g., employees, people) available to the individual steps which make up the process instances while taking into account the overall state and the business objectives of the enterprise. The mechanism is applicable in situations where enterprises require the ability to provide dynamic runtime assignment based on factors such as skills, workload availability and cost and business objectives such as penalties incurred when a process takes too long to complete. The mechanism substantially reduces service level violation penalties, improves service levels and significantly increases business value.

The present invention comprises a decision-making mechanism for real-time scheduling in a multi-process environment. The mechanism can be applied to complex business process routing to provide both dynamic real-time assignment of process steps to resources and resources to process steps. In operation, the mechanism of the invention is based on several principles described below.

For each process step, and resource capable of processing this step, a quantity referred to as a service index is calculated, wherein a higher value of the service index indicates a higher priority of the step assignment to the resource. The service index is a function of several factors, whereby each factor takes a particular set of measures into consideration. In other words, the calculation of the service index takes into account several different sets of measures, including (1) business level measures, examples of which include violation penalties associated with missing a process/sub-process deadlines and benefits and penalties associated with processes of a specific customer; (2) operational measures, examples of which include the time each existing process instance has already spent in the system, the state of each process instance, i.e. which steps have already been completed and which are still required to be fulfilled, and the residual processing time of the instance, i.e. how much work still remains to complete the process instance; and (3) employee level measures, examples of which include how quickly the individual employee can complete the instance step, the preferences of the employee and the workload of the employee.

Based on the calculated service indices, the decision on step-to-resource assignment is carried out. Several example embodiments for carrying out such decisions are presented infra. The example embodiments cover various mechanisms for assigning resources and process steps, such as pull, push and mixed mechanisms.

Figure 2:
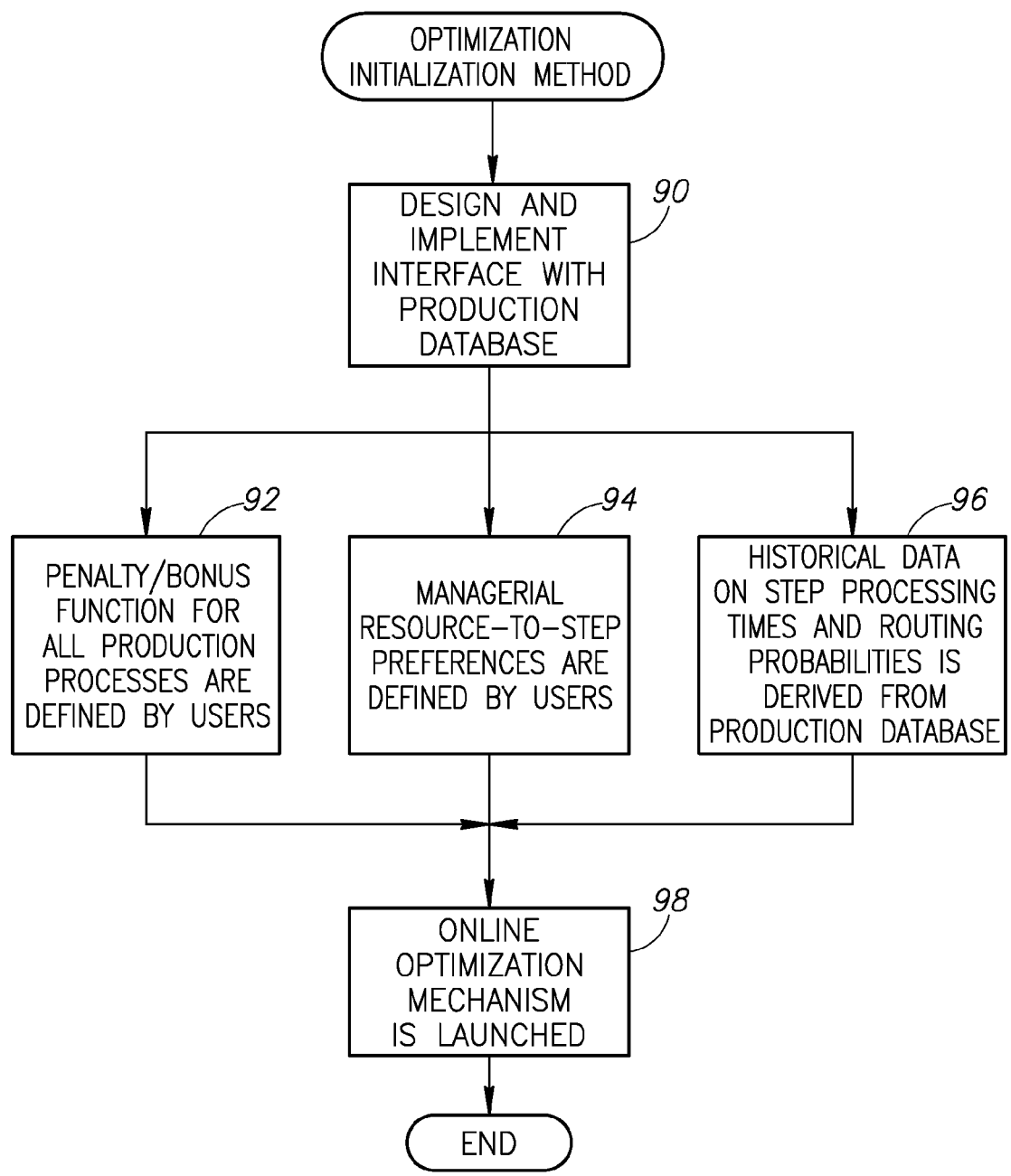
FIG. 2 is a flow diagram illustrating an example initialization embodiment of the resource optimization mechanism of the present invention.

In some embodiments of this invention, an initialization procedure may be required. A flow diagram illustrating an example initialization embodiment of the resource optimization mechanism of the present invention is shown in FIG. 2. During this process, if historical data is required for the calculation of the service index, the interface with the enterprise production database is designed and implemented (step 90). In this embodiment, once this step is complete, several initialization steps can be carried out in parallel. In a first step, penalty and bonus functions for all production processes are defined by the users (step 92). These functions are used in the computation of service index values. In a second optional step, the managerial resource-to-step assignment preferences may be defined by the users (step 94). The managerial resource-to-step assignment preferences are used in the computation of service index values. If historical data is taken into account in calculation of the service index, in a third step, historical data on step processing times and routing probabilities is derived from one or more production databases. In some embodiments of this invention, these values can be periodically updated by re-running the same mechanism in the initial generation. The historical data is used in the calculation of values which serve for the computation of the service index. Once the initialization procedure is complete, the main online resource optimization mechanism can be launched (step 98).

Figure 3:
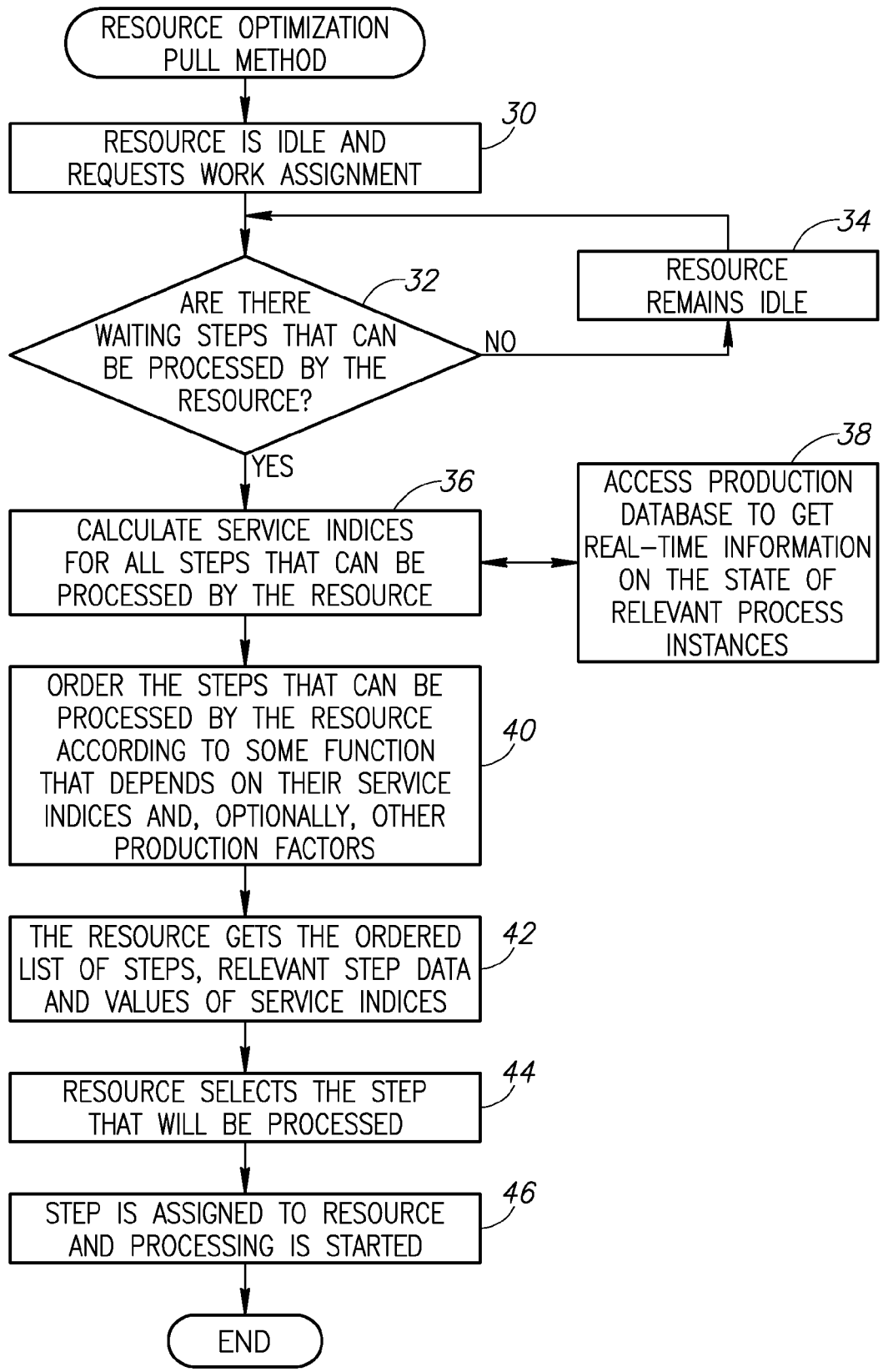
FIG. 3 is a flow diagram illustrating an example pull model embodiment of the resource optimization mechanism of the present invention.

A flow diagram illustrating an example pull model embodiment of the resource optimization mechanism of the present invention is shown in FIG. 3. This method is triggered when a resource is idle and requests a work assignment (step 30). Note that a resource may be a human (e.g., employee, worker, etc.), machine or any other entity that is capable of performing a step in a business process.

If there are no steps waiting that can be processed by the resource (step 32), than the resource remains idle (step 34). If there are steps waiting that can be processed by the resource, than a service index is calculated for each step that can be processed by the resource (step 36). Note that in calculating the service indices, one or more the production databases may be accessed to obtain real-time information on the state of relevant process instances (step 38).

Once the service indices are calculated, the steps that can be processed by the resource are ordered in accordance with a function (step 40). The function takes into account the service indices and, typically, other production factors. In the simplest case, the steps are ordered according to the corresponding service indices. Based on the values of this function, the priority of the resources handling the available steps is determined, and the resource assignment is carried out. In one embodiment, the resource is presented with the list of steps ordered according to this priority, relevant step data and the priority (step 42). Note that not all steps that can be handled by a resources must be prioritized—rather it is possible to only prioritize and present any subset of steps that can be handled by the resource. The resource then selects a step to be processed from the ordered list presented (step 44). The selected step is assigned to the resource and the resource is then able to begin processing the step (step 46). In an example embodiment, when an employee becomes available, all steps that this employee can work on are displayed, sorted in order of descending service index as shown in Table 1 below. In general, the action next taken will vary depending on the particular implementation. In one embodiment, the resource simply chooses which step to work on next. Alternatively, the user may want to first filter some of the items or there may be multiple separate queues the user can access, each of which may be sorted by a service index. Alternatively, a user may focus on one queue, review the items in that queue, and see the top service index items from the other queues. Another alternative is one in which a single step is presented to the user based on the results of the prioritization.

TABLE 1

Example ordered list of steps

| StepID | LoanID | Loan Amount | Service Index |
|--------|--------|-------------|---------------|
| 32     | 101    | $200,000    | 500           |
| 11     | 75     | $ 50,000    | 200           |
| 34     | 153    | $250,000    | 150           |

Figure 4:
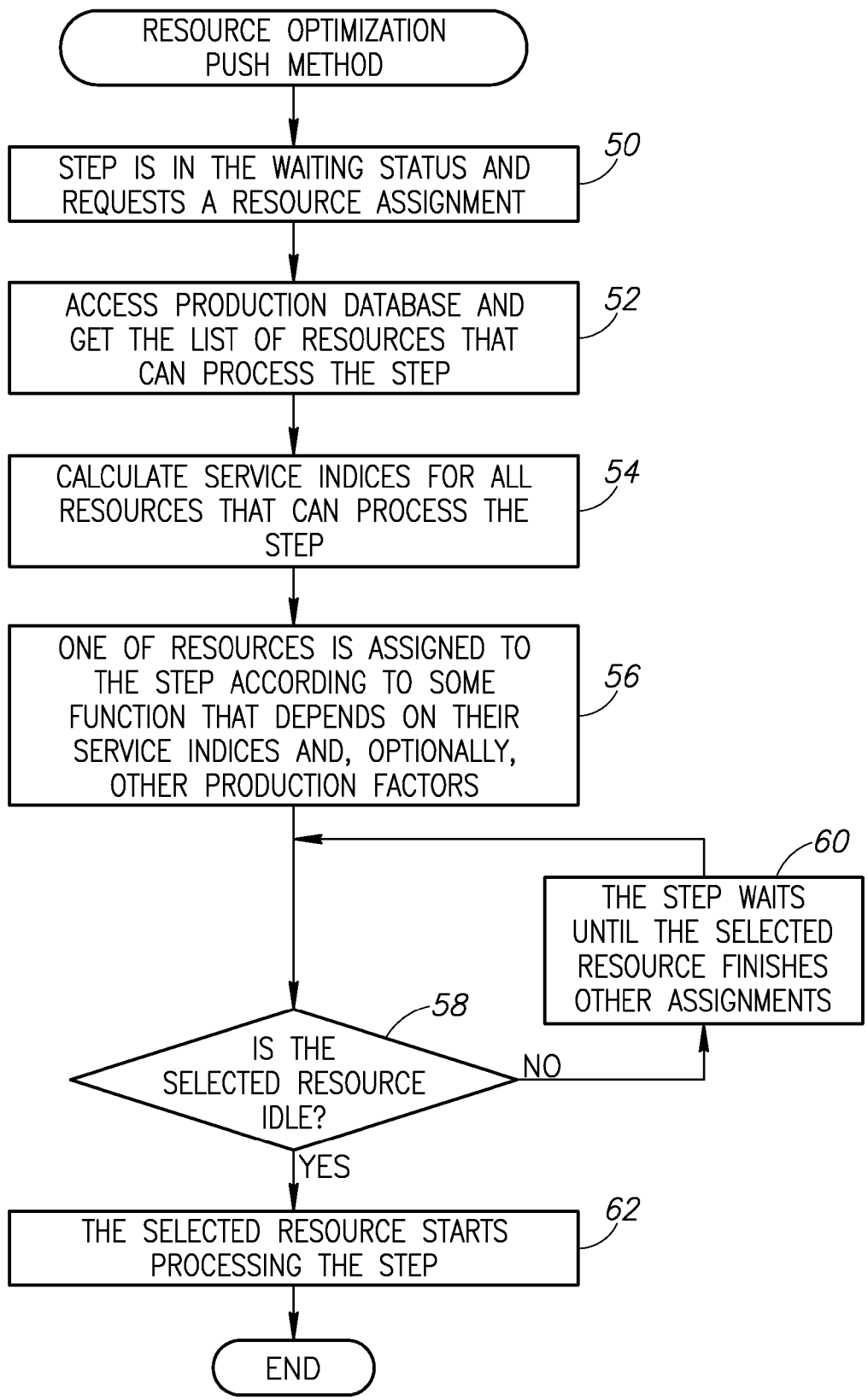
FIG. 4 is a flow diagram illustrating an example push model embodiment of the resource optimization mechanism of the present invention.

A flow diagram illustrating an example push model embodiment of the resource optimization mechanism of the present invention is shown in FIG. 4. This method is triggered when a step is in the waiting mode and requests a resource assignment (step 50) which should be performed at the time of the request even if there are no resources that can immediately process the step. One or more production databases are accessed and a list of resources that can process the particular step is determined (step 52). A service index is calculated for each resource (or any subset of resources) that can process the particular step (step 54). From among the set of resources that is capable of processing the step, one or more may be selected (step 56). The resource is selected in accordance with a prioritization based on a function of the service index. The function may depend not only on the corresponding service index but also on the production factors. In the simplest case, the resource is assigned to the step with the maximal service index.

In another embodiment, when a step becomes ready for processing fulfillment, the step can be assigned to individual employees so as both to balance the work load and balance the sum of service indices assigned to the employees. If the selected resource is idle (step 58), the selected resource begins processing the particular step (step 62). If the selected resource is not idle, than the step waits until the selected resource finishes other assignments and becomes idle (step 60).

Figure 5:
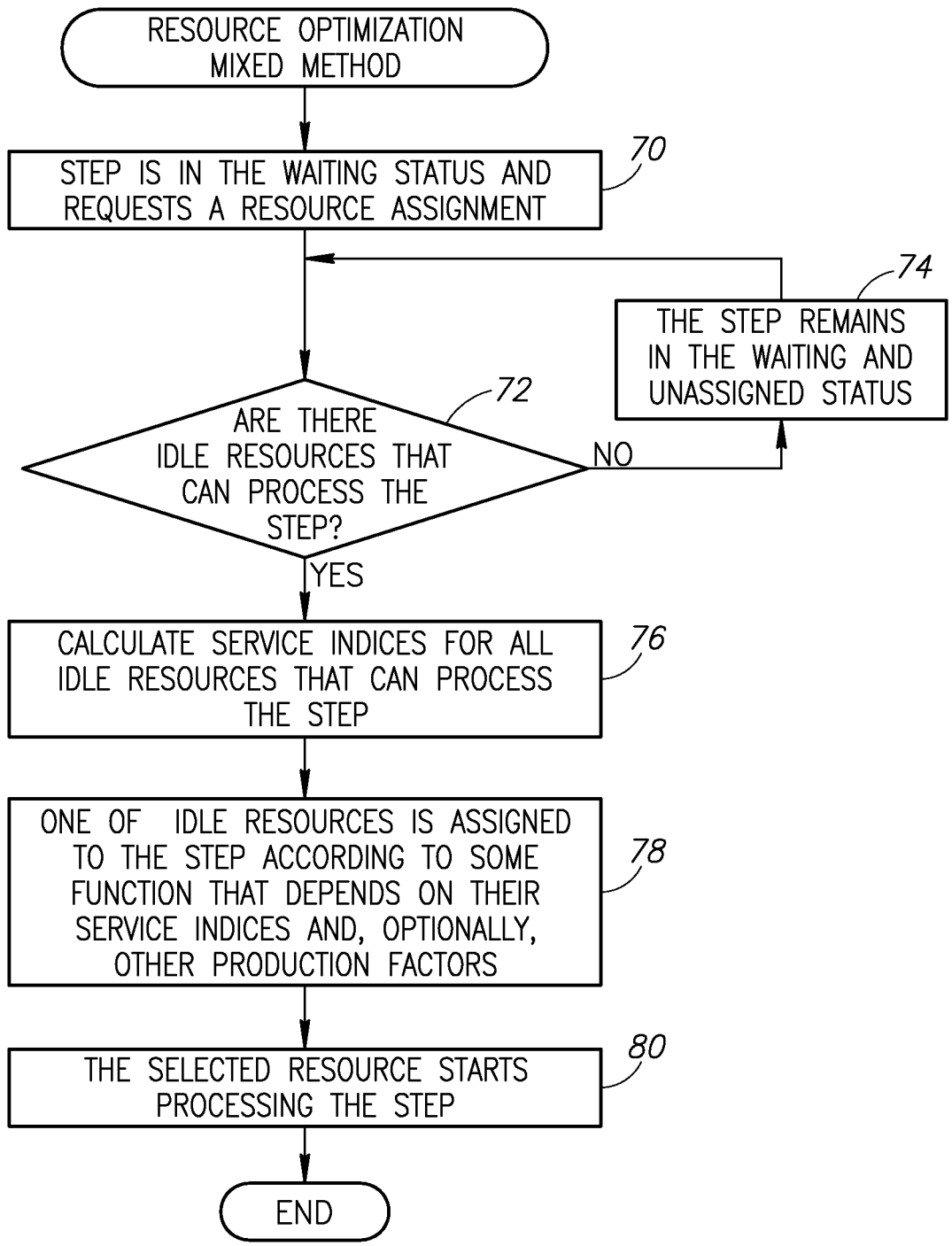
FIG. 5 is a flow diagram illustrating the mixed model embodiment of the resource optimization mechanism of the present invention.

A flow diagram illustrating an example mixed model embodiment of the resource optimization mechanism of the present invention is shown in FIG. 5. This method is triggered when a step is in the waiting mode and requests a resource assignment (step 70). If there are no idle resources that can process the particular step, than the step remains in the waiting mode with unassigned status (step 74). If there is an idle resource that can process the step (step 72), then a service index is calculated for each idle resource that can process the step (step 76). From among the set of idle resources that is capable of processing the step, one is selected (step 78). The resource is selected in accordance with a function. The function depends on the corresponding service index in addition to zero or more other production factors. The selected resource then begins processing the step (step 80). Note that in one embodiment, when a resource (e.g., an employee) becomes available, the resource is assigned the step with the maximal service index. In another embodiment, when a step becomes ready for processing fulfillment, the step can be assigned to individual employees so as both to balance the work load and balance the sum of service indices assigned to the employees.

A more detailed description of an embodiment of the resource optimization mechanism of the present invention will now be provided. The embodiment has application in situations where the objective function is to optimize in minimizing the costs associated with service level agreement (SLA) violations and in the late binding case, i.e. deciding which step a user should work on next when a user becomes available for doing additional work.

Workflow Model

A description of our workflow model will now be provided below. It is important to note that the resource optimization mechanism of the present invention supports any workflow that can be captured in languages such as BPMN, XPDL, etc., i.e. any standard modeling language. It is not intended that the following description limits the scope of the invention, as one skilled in the art can apply numerous other workflows to the mechanism of the invention.

Our workflow model covers a general workflow, where tasks (i.e. steps) can be performed either sequentially (one step at a time) or in parallel (several steps at a time). In order to introduce this model we first define two basic types of workflow, and, second, incorporate them into a general framework.

The first basic type (Type 1) of workflow is the Sequentially Executable (SE) workflow which is executed step-by-step (i.e. one step at a time). The order of steps can be, however, non-deterministic. If there are several steps that can potentially follow a step that is currently processed, different mechanisms can be used in order to determine a step that will be processes next: Monte-Carlo simulation according to some probability vector, condition that depends on workflow or step attributes, "first true" condition etc. Note that a certain step in the SE workflow may be processed more than once (loops are permitted) or not at all. Only one step at a time is processed. In one example embodiment, the first step of the workflow is chosen according to the initial probability distribution $\overline{P}_0 = (P_{0k}, 1 \leq k \leq K)$. After step completion, the next step is chosen according to the routing probability matrix $P = (P_{lk}, 1 \leq l, k \leq K)$. Matrix P is sub-stochastic, i.e.

$$\sum_{k=1}^{K} P_{lk} \leq 1, 1 \leq l \leq K.$$

The probability of finishing the workflow after completion of step l is equal to $$1 - \sum_{k=1}^{K} P_{lk}.$$

Figure 6:
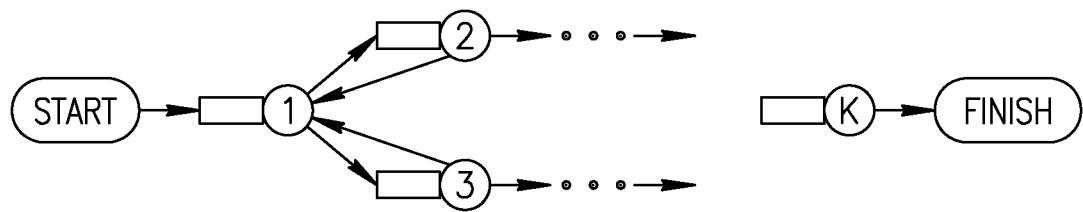
FIG. 6 is a diagram illustrating an example basic sequentially executable workflow.

A diagram illustrating an example of a basic SE workflow is shown in FIG. 6, where solid arrows denote sequential steps. Note that in this embodiment of the SE model, processing time of a step and transitional probabilities from a step are independent of the number of times the step is processed. Note also that the SE model incorporates splits with "first true" condition.

Figure 7:
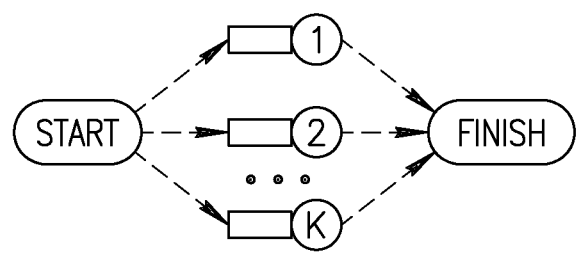
FIG. 7 is a diagram illustrating an example basic parallel executable workflow.

The second basic type (Type 2) of workflow is the basic parallel (BP) workflow which consists of several steps that can be processed simultaneously. A workflow is finished once all steps required to be processed are finished. The invention comprises a general mechanism that determines which steps in the BP workflow are required to be processed. The special cases include: (1) all parallel steps must be processed; (2) k-out-of-n steps must be processed (3) the set of steps that must be processed is determined via Monte-Carlo simulation. The set of processed steps can also depend on workflow or step attributes. A diagram illustrating an example basic parallel executable workflow is shown in FIG. 7 where dashed arrows denote parallel steps.

In order to model a general process, a recursive structure of SE and BP sub-processes is used where each sub-process may comprise both basic steps and other sub-processes. Virtually all business processes that are managed via Business Process Management (BPM) software can be described using this model. A general workflow is defined according to the following rules:
1. A workflow contains K steps. Each step has its mean processing time $\overline{S}_k$, $1 \leq k \leq K$, and processing-time distribution.
2. A workflow contains W sub-workflows, including a single main sub-workflow. Each step belongs to one of the sub-workflows.
3. Each sub-workflow has a level $L(w) \geq 1$, $1 \leq w \leq W$. The main sub-workflow is level one. If w is not a main sub-workflow, $L(w) > 1$.
4. A parent-child relation is defined between sub-workflows. Each sub-workflow, except the main sub-workflow, has a single parent. If sub-workflow $w_1$ is the parent of sub-workflow $w_2$, then $L(w_1) = L(w_2) - 1$.
5. Each sub-workflow comprises either an SE structure or a BP structure. Components of this structure are either steps or child sub-workflows.

Components of the main sub-workflow are processed according to the rules, specified in Type 1 and Type 2 descriptions supra. If any child sub-workflows are initiated, they are processed according to the same rules.

Figure 8:
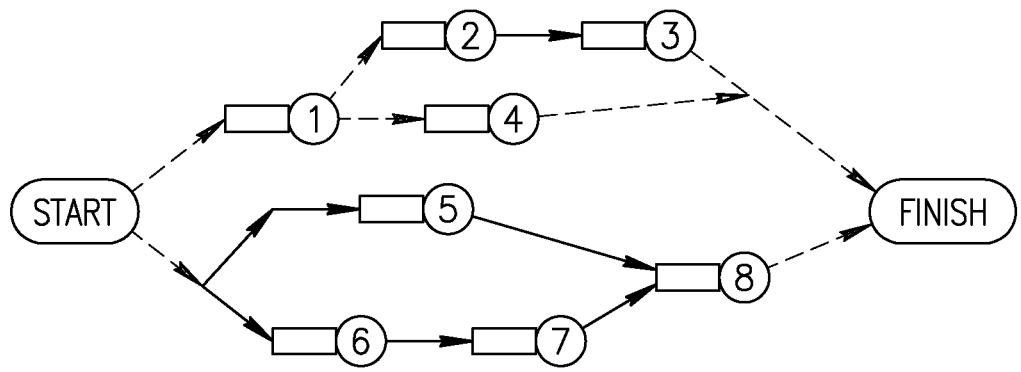
FIG. 8 is a diagram illustrating an example general workflow.

A diagram illustrating an example general workflow is shown in FIG. 8 where solid arrows denote sequential steps and dashed arrows denote parallel steps. This example workflow comprises eight steps. The main sub-workflow is parallel and comprises two SE child sub-workflows. The first SE sub-workflow (level 2) corresponding to steps 1-4 comprises two components: step 1 and a parallel child sub-workflow corresponding to steps 2-4. The second SE sub-workflow comprises steps 5-8 and does not have any child sub-workflows. The parallel sub-workflow (level 3) comprises step 4 and a SE child sub-workflow workflow corresponding to steps 2-3. The SE sub-workflow (level 4) comprises steps 2 and 3. Note that there are no steps that belong to level 1; steps 1 and 5-8 belong to level 2; step 4 belongs to level 3 and steps 2 and 3 belong to level 4.

SLA Definition

For the embodiment under discussion, the SLA is defined via the end-to-end time, also referred to as the sojourn time, required to complete a workflow or its submap. Note that although the overall workflow sojourn time of an instance is referred to infra, the same definitions and algorithms can be applied to a submap sojourn time. Assuming there exist I different workflows, and given the above type of SLA, penalty functions $C_i(s)$, $1 \leq i \leq I$, are defined where s is the process sojourn time. This penalty function can be any non-decreasing function that is piecewise continuous. Examples of such functions are (1) defined as a non-decreasing continuous function which may be negative, indicating a bonus for early completion; (2) defined via a set of time points divided into two groups: finishing before a bonus time point results in a bonus while penalty time points define a set of deadlines wherein each deadline increases penalties (note that the second case corresponds to a piecewise constant non-decreasing penalty function); and (3) defined as a combination of the two previous definitions 1 and 2 supra, i.e. a piecewise continuous non-decreasing function. Note that different processes may have different penalty functions, and besides the sojourn time, the function may also depend on attributes of the process instance (e.g., customer name, loan amount, etc.).

Formally, in the third case, which is the most general case, a penalty function is defined by the following components:
1. For each workflow i, a set of intervals, $[0, t_1^i)$, $[t_1^i, t_2^i), \ldots [t_{n_i}^i, \infty)$.
2. For each workflow i, a set of functions, $C_i^j$, $j \in 0, \ldots, n_i$, $1 \leq i \leq I$, such that $C_i^j$ is defined over the interval $[t_j^i, t_{j+1}^i)$ (where $t_{n_i+1}^i = \infty$). We assume the following:
   a. $\forall j \in 0, \ldots, n_i$, $\forall i \in 1, \ldots, I$, $C_i^j$ is continuous and non-decreasing over the interval $[t_j^i, t_{j+1}^i)$.

b. $\forall i \in 1, \ldots, I, C_i^o(0) \leq 0$.

c. $\forall j_1, j_2 \in 0, \ldots, n_i, 1 \leq i \leq I, \forall t_1 \in [t_{j_1}^i, t_{j_1+1}^i), \forall t_2 \in [t_{j_2}^i, t_{j_2+1}^i)$ such that $j_1 < j_2$, it must hold that $C_i^{j_1}(t_1) \leq C_i^{j_2}(t_2)$, i.e. the penalty is non-decreasing across the entire time domain.

Algorithm Definition

The Gcμ rule is defined as follows:
1. Customers are divided into a set of I classes.
   2. There are J classes of servers, such that a server of class j serves a customer of class i at rate $\mu_{ij}$.
   3. For each class i∈I, there is a penalty function $C_i(t)$, where $C_i(t)$ is the penalty incurred by a class i customer who waits for t time units. It is assumed that $C_i$ is a strictly increasing, strictly convex function with two continuous derivatives. Moreover:
      a. $C_i$ is defined over the interval $[0, \infty)$.
      b. $C_i(0)=0$.

Based on these quantities, the following decision is made: Let $W_i(t)$ be the waiting time of the customer at the head of the class-i queue at time t. When becoming free at time t, a server from pool j next serves the customer from class i that maximizes $\mu_{ij} C_i'(W_i(t))$, where $C_i'$ is the first derivative of $C_i$ and $\mu_{ij}$ is the corresponding service rate.

Note that the above algorithm takes the following into account: (1) the waiting cost at time point t which is taken into account by the penalty functions $C_i$, i∈I; (2) the time that the customer has already waited which is taken into account by using $W_i(t)$; (3) the remaining service time of the customer which is taken into account by the service rate $\mu_{ij}$; and (4) the speed of the server which is taken into account by the service rate $\mu_{ij}$.

Note that when making a decision regarding which request to handle next, the mechanism tries to minimize the multiplication of the cost differential at the current point in time, and the remaining service time of the customer.

The following notation and terminology apply throughout this document.

Penalties and Indices:
 l index of the instance;
 i index of the workflow (class) that instance l belongs to;
 $C_i(\bullet)$ penalty function for workflow i;
 j index of the resource that is currently available which needs to select an instance and step to serve;
 k index of step;

Sojourn and Processing Times:
As described supra, sojourn time is defined as the end-to-end time required to complete a workflow or its part (e.g., sub-workflow). Processing time is the time required to complete a workflow or its part given no delays are encountered. In the other words, as soon as a step can be processed, its processing begins. For example, the processing time of a SE workflow is the sum of processing times of the processed steps and the processing time of a BP workflow is the maximum of processing times of the processed steps. If some steps of an instance were already processed, residual processing time (or residual sojourn time) is the time until completion of the workflow or its part. Notation for sojourn and processing times includes the following:
 $W_l$ current sojourn time of instance l;
 $\overline{U}_i$ Expected Processing Time (EPT) of process i;
 $\overline{R}_l$ Expected Residual Processing Time (ERPT) of instance l (this can be estimated, e.g., based on overall historical data);
 $\overline{S}_{ik}^o$ mean service time for step k of workflow i (based on overall historical data);
 $\overline{S}_{jik}$ mean service time of resource j for step k of workflow i (based on historical data of a specific resource);

Note that information on the service durations of the steps of an instance are required in order to calculate expected residual processing time of the instance. In the case of a workflow with sequential steps only, the expected residual processing time is the mean of a phase-type distribution, which can be computed via standard mathematical methods. In the case of a complex workflow with parallel steps and non-deterministic step durations, theoretical calculation of the expected residual processing time is typically difficult. In this case, processing time may be derived using either deterministic approximation or simulation.

Calculation of the Service Index. General Framework:

The calculation of the service index will now be described in more detail. In general, the service index is calculated as a function of n factors and n coefficients, i.e. a function si(factor$_1$, ..., factor$_n$, c$_1$, ..., c$_n$), where each factor factor$_i$, $1 \leq i \leq n$, enables taking a specific set of measures (business, operational, employee level, etc.) into account, and the coefficient $c_i$, $1 \leq i \leq n$ represents the importance of factor$_i$ relative to the other factors, i.e. if $c_i > c_1$ then factor$_i$ is more important than factor$_j$. In many cases, it may hold that the coefficients sum to unity, i.e. that $$\sum_{i=1}^{n} c_i = 1.$$

Given this set of factors and coefficients, the service index function 'si' can be a general function over these factors and coefficients. Examples of how these factors can be used by function si include:

1. The service index si may be a multiplication of the factors, i.e.

$$si(\text{factor}_1, \ldots, \text{factor}_n, c_1, \ldots, c_n) = \prod_{i=1}^{n} \text{factor}_i.$$

Note that in this case, the coefficients are ignored.

2. The service index si may be a weighted multiplication, i.e.

$$si(\text{factor}_1, \ldots, \text{factor}_n, c_1, \ldots, c_n) = \prod_{i=1}^{n} \text{factor}_i^{c_i}.$$

3. The service index si may be a weighted addition, i.e.

$$si(\text{factor}_1, \ldots, \text{factor}_n, c_1, \ldots, c_n) = \sum_{i=1}^{n} c_i \cdot \text{factor}_i.$$

4. The service index si may be a conditional expression, i.e.

$$si(\text{factor}_1, \ldots, \text{factor}_n, c_1, \ldots, c_n) = \begin{array}{l} \text{if factor}_3 > 0.99 \\ \text{then} \dfrac{\text{factor}_1}{\text{factor}_2} \\ \text{else} \dfrac{\text{factor}_4}{\text{factor}_5} \end{array}.$$

Thus, the following must be specified in implementing the mechanism of the invention: (1) the set of factors and coefficients, and how they are calculated/obtained; and (2) the implementation of the service index function given the factors and coefficients.

The mechanism incorporates the business level measure of "deadline violation penalties" into the calculation of service index, i.e. for process i, we allow the specification of a non-decreasing piecewise-continuous penalty function $C_i(s)$, where s is the process sojourn (end-to-end) time in the system. This general form of a penalty function includes major penalty scenarios such as: "If the process was not finished within x units of time, pay penalty y" or "If the process was not finished within x units of time, pay penalty z for each additional time unit". This model also enables incorporating bonuses for early completion and can be generalized by one skilled in the art to penalty functions for sub-process sojourn times.

The example embodiment presented infra also utilizes "processing time" and "expected residual processing time" or ERPT. Processing time is the time required to complete a process or its part given no delays are encountered, i.e. there are enough resources to process any step immediately. If some steps of an instance were already processed, ERPT is the time until completion of the process, given no delays are encountered.

Calculation of the Service Index. Example Embodiment:

An example embodiment of a resource allocation algorithm which incorporates the calculation of the service index is provided below which uses the well-known generalized-cμ (Gcμ) scheduling rule frequently used in call center applications combined with techniques used in manufacturing environments. A mathematical model, suitable for implementation in software, of a process structure that enables a rigorous formulation of our service index calculation is provided first.

Generally, the resource allocation algorithm can calculate the service index using any number of factors. To illustrate the principles of the present invention, an example embodiment is provided infra that calculates a service index comprising five indices. In this example, the resource allocation algorithm is a computationally effective decision-making algorithm that takes into account the waiting costs, the time the instance has already spent in the system, the residual service time of the instance, the speed of the resource and its preferences. A service index $U_{jlk}$ is defined for each feasible combination of resource j, instance l and step k. Then, in the simplest case, instance/step is assigned to resource j according to the following $$(l^*, k^*) = \arg\max_{l,k} U_{jlk}. \quad (1)$$

In the general case, the task assignment decisions are based on service indices and, probably other production factors.

In this embodiment, the service index $U_{jlk}$ is computed via the product of five indices:

$$U_{jlk} = U_l^c \cdot U_l^r \cdot U_{lk}^{par} \cdot U_{jlk}^s \cdot U_{jlk}^p, \quad (2)$$

where $U_l^c$ is the penalty index; this index takes into account potential SLA violation penalties that will be incurred if additional delays will be encountered by the process instance. This is any function which is non decreasing in the time required to complete the process.

$U_l^r$ is the index of residual processing time; This is any function that gives a higher value to workflow instances that are close to completion. Such policy decreases the number of instances that currently reside in the system and improves performance.

$U_{lk}^{par}$ is the index of parallel steps; this index must be calculated if several steps of the same instance are ready for processing. This is any function that gives higher priority to steps that belong to potentially longest (critical) parallel paths of the workflow.

$U_{jlk}^s$ is the index of resource speed; this index is higher for resources with shorter expected processing time of the step.

$U_{jlk}^p$ is the index of resource preferences; this index provides to manager/administrator of the system an option to input her/his own preferences concerning resource/step assignment.

Example embodiments of each of these five indices (also referred to as factors) is discussed in more detail infra.

Penalty Index:

This index depends on Expected Residual Processing Time (ERPT) of an instance, its current sojourn time and penalty function of the corresponding workflow.

In the best case (i.e. no delays, all steps are processed immediately once they are ready for processing), the mean sojourn time of instance l is equal to $W_l + \overline{R}_l$ (current sojourn time plus ERPT). The SLA violation penalty in the best case, is, therefore, approximated by $C_i(W_l + \overline{R}_l)$. The value of the penalty index depends on the rate of increase of function $C_i$ after the best case mean sojourn time $W_l + \overline{R}_l$. In the other words, we approximate derivative of function $C_i$. One of possible implementations of the penalty index is the following:

Define bandwidth Δ, which is calculated as $\Delta = a \cdot \overline{R}_l$, where a>0 is a positive parameter. Note that bandwidth decreases as the instance proceeds towards the end of the workflow. Then the penalty index is given by:

$$U_l^c = \frac{C_i(W_l + \overline{R}_l + \Delta) - C_i(W_l + \overline{R}_l)}{\Delta}. \quad (3)$$

In deriving Equation 3 above, we define the smoothed continuous and piecewise-differentiable version of the penalty function $$C_i^\%(t) = \frac{\int_t^{t+\Delta} C_i(u) du}{\Delta}. \quad (4)$$

If $W_l + \overline{R}_l$ and $W_l + \overline{R}_l + \Delta$ are continuity points of function $C_i(\bullet)$, it follows to check that $$U_l^c = \frac{C_i(W_l + \overline{R}_l + \Delta) - C_i(W_l + \overline{R}_l)}{\Delta} = C_i^\%(W_l + \overline{R}_l). \quad (5)$$

We observe that Equation 5 generalizes the cost term in the well-known Gcμ rule. If either $W_l + \overline{R}_l$ or $W_l + \overline{R}_l + \Delta$ are not continuity points of $C_i(\bullet)$, then the derivative $C_i^\%(W_l + \overline{R}_l)$ is not defined well. One can still use Equation 2 which is based on the difference of penalty functions.

Note that simulations by the inventors have demonstrated the importance of the cost index. It was also shown that it is preferable to replace Equation 4 by $$U_l^c = 1 + \frac{C_i(W_l + \overline{R}_l + \Delta) - C_i(W_l + \overline{R}_l)}{\Delta}. \quad (6)$$

In this case, the cost index is never equal to zero. Note that a cost index value of zero implies a service index value of zero, even if the other indices are large. This is not desirable in a workflow setting. In addition, simulations have shown that one is a reasonable value of the bandwidth parameter a.

Index of Residual Processing Time:

This index depends on ERPT (Expected Residual Processing time) $\overline{R}_l$ of instance l and on EPT (Expected Processing Time) $\overline{S}_i$ of the corresponding process i. (In contrast to ERPT, EPT should not be recalculated online.) The index increases, as ERPT decreases, due to the reasons explained above. On the other hand, it can be unreasonable to give higher priorities to processes with short EPT, hence the index should be normalized with respect to EPT.

An example of the index implementation is given by:

$$U_l^r = \frac{\overline{S}_i}{\overline{R}_l}.$$

Note that the residual processing time index is equal to one when the instance is initiated (ERPT is equal to EPT at that moment). Then, as the instance is processed towards its termination, the value of the index increases.

Index of Parallel Steps:

Parallel index must be calculated if several steps of the same instance l are ready for processing. Otherwise, the default value is assigned to the index: $U_{lk}^{par}=1$.

The parallel index depends on the current state of instance (which steps were completed, which are still in processing and which are in the waiting state.)

The main principle behind the parallel index calculation is: "serve parallel steps with the longest processing times first", we adapt this principle to our general workflow model, giving higher priority to steps that belong to potentially longest (critical) paths of the workflow.

Index of Resource Speed:

This index depends on the overall mean processing time of the considered step and of the mean processing time of the considered step given it is processed by the considered resource.

It is preferable to assign a step to a fast resource versus a slow resource, where a natural benchmark for processing speed is provided by the overall average processing time of the corresponding resource. A possible implementation of the index of resource speed is given by:

$$U_{jik}^s = \frac{\overline{S}_{ik}^o}{\overline{S}_{jik}},$$

where $\overline{S}_{ik}^o$ is the overall mean processing time for step k in workflow i and $\overline{S}_{jik}$ is the corresponding mean processing time given resource j is assigned to step k. (Although historical process data is a natural source for $\overline{S}_{ik}^o$ and $\overline{S}_{jik}$ calculation, they may be also calculated from other sources, e.g., expert assessments.)

Index of Resource Preferences:

In addition, a manager/administrator of the system may have her/his own preferences concerning resource/step assignment. Therefore, the mechanism of the invention provides an opportunity to specify an index $U_{jik}^p$ which indicates a preference level between resource j and step k of workflow i. As an example, if resource j has a rare and important skill, low values of $U_{jik}^p$ would be assigned to steps that do not demand such a skill.

In an example embodiment, as described supra, each resource (i.e. employee, participant, etc.) that becomes available (i.e. is idle) receives a list of steps that they can process. The steps are ranked (i.e. ordered), with the rank based on Equation 2 supra. The resource then selects a step for processing using this information.

The need to define multiple SLAs and corresponding penalty functions for workflow i may potentially arise. In this case, in addition to the penalty function that is based on the sojourn time of the workflow, other penalty functions can be based on sojourn times for workflow parts (e.g. sub-workflows or submaps). A service index (Equation 2) is defined separately for each SLA. Note that indices of penalties, residual processing times and, in some cases, indices of parallel steps can be different for each SLA. Then, if instance l belongs to workflow i, Equation 2 is replaced by $U_{jlk}=f(U_{jlk}(1), \ldots, U_{jlk}(N_i))$, where $N_i$ is the number of SLAs for workflow i, $U_{jlk}(n)$, $1 \leq n \leq N_i$, is the service index that corresponds to SLA n, and f is a function that calculates the overall service index. An example of such function is the weighted SUM $$U_{jlk} = \sum_{n=1}^{N_i} \beta_{in} U_{jlk}(n),$$

where $\beta_{in}$ are the weighting coefficients.

Note that the methods presented supra are computationally effective. They only require operational data of the system and the instances that directly participate in the scheduling decision. Therefore, the invention enables real-time implementation of resource optimization in large-scale business process environments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of resource optimization for scheduling in a multi-process environment, said method comprising the steps of:
   detecting a resource is idle and requesting a work assignment;
   determining for all steps the resource is capable of processing, the following measures:
      a business level measure indicative of a penalty due to missing a deadline for completing the step,
      a parallel step measure indicative of a length of a path of tasks dependent on the step;
      a user preference measure;
      a real time operational measure of a current time measure of the handling of the step; and
      an employee level measure indicative of a preference that the step be handled by the resource instead of by other resources;
   calculating a service index, for each step the resource is capable of processing, as a product of the business level measure, the parallel step measure, the user preference measure, the real time operational measure, and the employee level measure determined for the step;
   ordering said steps that can be processed by said resource in accordance with the calculated service indices of the steps; and
   providing said ordered list of steps and values of said service indices to the resource, for selecting a step for processing by the resource;
   wherein said steps of detecting, determining, calculating, ordering, and providing are implemented in either of
      computer hardware configured to perform said detecting, determining, calculating, ordering, and providing steps, and
      computer software embodied in a non-transitory, tangible, computer-readable storage medium.

2. The method according to claim 1, wherein calculating said service index comprises obtaining information from a production database on a state of relevant process instances, wherein each process instance belongs to one of a plurality of process types and is used in assigning resources available to individual steps making up a process instance.

3. The method according to claim 1, wherein said service index is calculated as a function of a plurality of factors, wherein each factor takes a particular set of measures into account including said business level measures, said operational measures and said employee level measures.

4. The method according to claim 3, wherein said plurality of factors are chosen from a group comprising: penalties, residual processing time, index of parallel steps, resource speed and one or more resource preferences.

5. The method according to claim 3, wherein said plurality of factors are weighted.

6. The method according to claim 1, wherein said plurality of steps is presented to said resource in order of which they should be processed.

7. The method according to claim 1, wherein said plurality of steps is presented to said resource in order of descending service index.

8. The method according to claim 1, wherein determining the real time operational measure of a current time measure of the handling of the step comprises determining the time the step spent in the multi-process environment.

9. The method according to claim 1, wherein determining the real time operational measure of a current time measure of the handling of the step comprises determining the residual time required to complete the step.

10. The method according to claim 1, wherein determining the real time operational measure comprises calculating a ratio of an expected processing time of the step over a residual processing time of the step.

11. The method according to claim 1, wherein determining the employee level measure comprises calculating a ratio of a processing time of the step by the resource divided by an average processing time of the resource.

12. The method according to claim 1, wherein the business level measure is calculated by the formula:

$$U_l^c = \frac{C_i(W_l + \overline{R}_l + \Delta) - C_i(W_l + \overline{R}_l)}{\Delta},$$

$\Delta = a \cdot \overline{R}_1$, where $a > 0$, where $W_l$ is a current sojourn time of the step, $\overline{R}_l$ is an Expected Residual Processing Time (ERPT) of the step and $C_i(s)$ is a non-decreasing piecewise-continuous penalty function.

13. A method of resource optimization for scheduling in a multi-process environment, said method comprising the steps of:
   detecting a step is in a waiting status and is requesting a resource assignment;
   determining whether there are any idle resources that are able to process said step;
   for all idle resources capable of processing said step, calculating a service index for each resource capable of processing said step, wherein said service index calculation is a product of a business level measure indicative of a penalty due to missing a deadline for completing the step, a real time operational measure of a current time measure of the handling of the step, a user preference measure, a parallel step measure indicative of a length of a path of tasks dependent on the step, and an employee level measure indicative of a preference that the step be handled by the resource instead of by other resources, wherein a higher value of service index indicates a higher priority of assigning said step to said resource;
   ordering said idle resources that can process said step in accordance to said service index calculation;
   assigning one of said idle resources to said step in accordance with a function of said service index;
   said resource begins processing said step;
   wherein said steps of detecting, determining, calculating, ordering and assigning are implemented in either of
      computer hardware configured to perform said identifying, tracing, and providing steps, and
      computer software embodied in a non-transitory, tangible, computer-readable storage medium.

14. The method according to claim 13, wherein calculating said service index comprises obtaining information from a production database on a state of relevant process instances, wherein each process instance belongs to one of a plurality of process types and is used in assigning resources available to individual steps making up a process instance.

15. The method according to claim 13, wherein said service index is calculated as a function of a plurality of factors, wherein each factor takes a particular set of measures into account including said business level measures, said operational measures and said employee level measures.

16. The method according to claim 15, wherein said plurality of factors are chosen from a group comprising: cost, residual processing time, index of parallel steps, resource speed and one or more resource preferences.

17. The method according to claim 15, wherein said plurality of factors are weighted.

18. The method according to claim 13, wherein said step is assigned to the resource corresponding to a maximal service index.

19. A method of resource optimization for scheduling in a multi-process environment, the method comprising the steps of:
   detecting a step is in a waiting status and is requesting a resource assignment;
   obtaining a list of resources that can process said step;
   for all resources capable of processing said step, calculating a service index corresponding thereto, wherein said service index calculation is a product of a business level measure indicative of a penalty due to missing a deadline for completing the step, a real time operational measure of a current time measure of the handling of the step, a user preference measure, a parallel step measure indicative of a length of a path of tasks dependent on the step, and an employee level measure indicative of a preference that the step be handled by the resource instead of by other resources, wherein a higher value of service index indicates a higher priority of assigning said step to said resource;
   ordering said resources that can process said step in accordance to said service index calculation;
   assigning said step to one of said resources in accordance with a function of said service index;
   said selected resource begins processing said step once it is idle;
   wherein said steps of detecting, obtaining, calculating, ordering and assigning are implemented in either of
      computer hardware configured to perform said identifying, tracing, and providing steps, and
      computer software embodied in a non-transitory, tangible, computer-readable storage medium.

20. The method according to claim 19, wherein calculating said service index comprises obtaining information from a production database on a state of relevant process instances, wherein each process instance belongs to one of a plurality of process types and is used in assigning resources available to individual steps making up a process instance.

21. The method according to claim 19, wherein said service index is calculated as a function of a plurality of factors, wherein each factor takes a particular set of measures into account including said business level measures, said operational measures and said employee level measures.

22. The method according to claim 21, wherein said plurality of factors are chosen from a group comprising: cost, residual processing time, index of parallel steps, resource speed and one or more resource preferences.

23. The method according to claim 21, wherein said plurality of factors are weighted.

24. The method according to claim 19, wherein said step is assigned to an idle resource corresponding to a maximal service index.

25. A computer program product for scheduling in a multi-process environment, the computer program product comprising:
   a non-transitory, tangible computer usable medium having computer usable code embodied therewith, the computer usable program code comprising:
   computer usable code configured for detecting a step is in a waiting status and is requesting a resource assignment;
   computer usable code configured for determining whether there are any idle resources that are able to process said step;
   computer usable code configured for calculating, for all idle resources capable of processing said step, a service index for each resource that can process a step and each step that can be processed by said resource, wherein said service index calculation is a product of a business level measure indicative of a penalty due to missing a deadline for completing the step, a real time operational measure of a current time measure of the handling of the step, a user preference measure, a parallel step measure indicative of a length of a path of tasks dependent on the step, and an employee level measure indicative of a preference that the step be handled by the resource instead of by other resources, wherein a higher value of service index indicates a higher priority of assigning said step to said resource;
   computer usable code configured for ordering said idle resources that can process said step in accordance to said service index calculation; and
   computer usable code configured for selecting or assigning one of said idle resources to said step in accordance with a function of said service index.

26. The computer program product according to claim 25, wherein the resource is presented a plurality of steps that can be processed by said resource ordered in accordance with said service indices.

27. The computer program product according to claim 25, further comprising computer usable code configured for assigning one of said plurality of steps selected by said resource to said resource for processing.

28. The computer program product according to claim 25, wherein said service index is calculated as a function of a plurality of factors, wherein each factor takes a particular set of measures into account including said business level measures, said operational measures and said employee level measures.

29. The computer program product according to claim 28, wherein said plurality of factors are chosen from a group comprising: cost, residual processing time, index of parallel steps, resource speed and one or more resource preferences.

* * * * *